United States Patent

Nagatomo et al.

Patent Number: 5,259,214
Date of Patent: Nov. 9, 1993

[54] AIR CONDITIONING SYSTEM

[75] Inventors: Hideaki Nagatomo; Katsuyuki Aoki; Toshihiro Tanaka; Kazuaki Isono; Yasuo Imaki; Seiji Kubo; Hidenori Ishioka, all of Shizuoka, Japan

[73] Assignee: Mitsubishi Denki Kabushiki Kaisha, Tokyo, Japan

[21] Appl. No.: 989,903

[22] Filed: Dec. 11, 1992

Related U.S. Application Data

[63] Continuation of Ser. No. 760,138, Sep. 16, 1991, abandoned.

Foreign Application Priority Data

Nov. 8, 1990 [JP] Japan .................. 2-302938

[51] Int. Cl.⁵ ............................. F25B 1/00
[52] U.S. Cl. .......................... 62/324.1; 62/430; 165/104.21
[58] Field of Search ............. 62/324.1, 238.6, 59, 62/99, 529, 238.7, 430; 165/104.11, 104.11 A, 104.21, 104.19, 146

[56] References Cited

U.S. PATENT DOCUMENTS

| | | | |
|---|---|---|---|
| 1,524,520 | 1/1925 | Junkers | 165/146 |
| 1,674,850 | 6/1928 | Bogardus | 165/146 |
| 1,835,887 | 12/1931 | Mackey | 165/146 |
| 2,276,527 | 3/1942 | Throckmorton et al. | 165/146 |
| 2,587,720 | 3/1952 | Fritzberg | 165/146 |
| 4,809,513 | 3/1989 | Goldstein et al. | 62/59 |

FOREIGN PATENT DOCUMENTS

| | | |
|---|---|---|
| 63-21450 | 1/1988 | Japan . |
| 63-163741 | 7/1988 | Japan . |
| 64-38563 | 2/1989 | Japan . |
| 6438563 | 2/1989 | Japan . |
| 1-174864 | 7/1989 | Japan . |
| 2-219987 | 9/1990 | Japan . |

Primary Examiner—Albert J. Makay
Assistant Examiner—William C. Doerrler
Attorney, Agent, or Firm—Oblon, Spivak, McClelland, Maier & Neustadt

[57] ABSTRACT

An air conditioning system comprising: a refrigeration cycle including a compressor, a reversing valve, a condenser, a pressure reducing device and an evaporator; a thermal storage heat exchanger which is arranged at a lower portion in a thermal storage tank with a thermal storage material filled therein, and whose refrigerant inlet side is smaller than its refrigerant outlet side in terms of heat exchange capability; and a thermal absorption heat exchanger which is arranged at an upper portion in the thermal storage tank in a way to be reverse to the flow direction of a refrigerant in the thermal storage heat exchanger.

5 Claims, 3 Drawing Sheets

AIR CONDITIONING SYSTEM

This application is a continuation of application Ser. No. 07/760,138, filed on Sep. 16, 1991, now abandoned.

BACKGROUND OF THE INVENTION

1. Field of the Invention

The present invention relates to an air conditioning system, and in particular an air conditioning system which includes a thermal storage unit capable of improving heating and defrosting properties.

2. Description of the Related Art

Such an air conditioning system with a thermal storage unit utilizes energy stored in the thermal storage unit at the start of heating, or for defrosting an outdoor heat exchanger during heating, thereby improving air conditioning properties. Such type of conventional air conditioning systems have been disclosed in e.g. Japanese Unexamined Patent Publication No. 21450/1988, Japanese Unexamined Patent Publication No. 38563/1989 and Japanese Unexamined Patent Publication No. 174864/1989.

Referring now to FIG. 4, there is shown a refrigeration cycle of a conventional air conditioning system with a thermal storage unit included therein.

In FIG. 4, reference numeral 1 designates a compressor. Reference numeral 2 designates a four port reversing valve. Reference numeral 3 designates an indoor heat exchanger which functions as a condenser during heating. Reference numeral 4 designates a pressure reducing device. Reference numeral 5 designates a two port bypass valve which bypasses the pressure reducing device 4. Reference numeral 6 designates an outdoor heat exchanger which works as an evaporator during heating. Reference numerals 7 designates a three port valve. Reference numeral 8 and 9 designate a thermal storage heat exchanger and a thermal absorption heat exchanger which are arranged at a lower portion and an upper portion in a thermal storage tank 10, respectively. Reference numeral 8a designates a thermal storage refrigerant inlet which is the refrigerant inlet of the thermal storage heat exchanger 8. Reference numeral 8b designates a thermal storage refrigerant outlet which is the refrigerant outlet of the thermal storage heat exchanger 8. Reference numeral 9a designate a thermal absorption refrigerant inlet which is the refrigerant inlet of the thermal absorption heat exchanger 9. Reference numeral 9b designates a thermal absorption refrigerant outlet which is the refrigerant outlet of the thermal absorption heat exchanger 9. Reference numeral 11 designates a thermal storage material which is filled in the thermal storage tank 10, whose melting point is 40°-60° C., and is made of paraffin or the like.

Now, an operation of the conventional air conditioning system which is constructed as stated above will be explained.

In the case of a heating and thermal storage operation, the two port bypass valve 5 is closed, and the three port valve 7 is switched to communicate with the four port reversing valve 2. A high temperature and high pressure gaseous refrigerant which has been discharged from the compressor 1 heats the thermal storage material 11 in the thermal storage tank 10 when it is passing through the thermal storage heat exchanger 8, and then passes through the four port reversing valve 2. The refrigerant carries out heat exchange with indoor air in the indoor heat exchanger 3 to carry out heating, thereby becoming a normal temperature and high pressure liquid refrigerant. After that, the liquid refrigerant is depressurized by the pressure reducing device 4, is evaporated in the outdoor heat exchanger 6 to become a gaseous refrigerant, and returns to the compressor 1 through the three port valve 7 and the four port valve 2. In this cycle, the thermal storage material 11 is melted due to such heating.

On the other hand, in the case of a defrosting operation which is carried out to eliminate frost deposited on the outdoor heat exchanger 6 during heating when an outdoor temperature is low, the two port bypass valve 5 is opened, and the three port valve 7 is switched to communicate with the thermal absorption heat exchanger 9. The high temperature and high pressure gaseous refrigerant which has been discharged from the compressor 1 heats the thermal storage material 11 in the thermal storage heat exchanger 8, and then passes through the four port reversing valve 2. The refrigerant carries out heat exchange with the indoor air in the indoor heat exchanger 3 to heat it to a limited extent, thereby becoming a two phase high temperature and high pressure refrigerant. After that, the two phase refrigerant passes through the two port bypass valve 5, and reaches the outdoor heat exchanger 6. In the outdoor heat exchanger 6, the refrigerant melts the frost on the surface of the outdoor exchanger, and becomes a low temperature and medium pressure liquid refrigerant. Then the liquid refrigerant passes through the three port valve 7, absorbs heat from the thermal storage material 11 in the thermal absorption heat exchanger 9 to be evaporated into a gaseous refrigerant, and returns to the compressor 1. In this cycle, the thermal storage material 11 is solidified due to such thermal absorption. In that manner, heating can be carried out even during defrosting, thereby preventing an indoor temperature from lowering during defrosting.

In addition, in the case of a heating kick off operation wherein heating can be started in a short and smooth manner when an outdoor temperature is low, the two port bypass valve 5 is opened, and the three port valve 7 is switched to communicate with the thermal absorption heat exchanger 9 like the defrosting operation. The high temperature and high pressure gaseous refrigerant which has been discharged from the compressor 1 heats the thermal storage material in the thermal storage heat exchanger 8, and then passes through the four port reversing valve 2. The refrigerant carries out heat exchange with the indoor air in the indoor heat exchanger 3 to heat it, thereby becoming a high temperature and high pressure liquid refrigerant. The liquid refrigerant passes through the two port bypass valve 5, through the outdoor heat exchanger 6 having the amount of heat exchange restrained to the minimum, and through the three port valve 7. The refrigerant absorbs heat from the thermal storage material 11 in the thermal absorption heat exchanger 9 to be evaporated into a gaseous refrigerant, and returns to the compressor 1. In this cycle, the thermal storage material 11 is solidified due to such thermal absorption. As explained, the refrigerant which returns to the compressor 1 is a high temperature gas. As a result, the efficiency of the compressor can be improved, and heating can be carried out in a rapid and sufficient manner at the start of heating even when the outdoor temperature is low.

By the way, the thermal storage heat exchanger 8 is arranged at the lowest portion in the thermal storage tank 10 so that a melted region of the thermal storage material 11 spreads upward in the thermal storage tank 10 due to convection with the lapse of time. In addition, considering that a raise in temperature of an upper portion of the thermal storage material 11 in the thermal storage tank far from the thermal storage heat exchanger 8 is later than a raise in temperature of a lower portion of the thermal storage material 11 in the thermal storage tank 10, the thermal absorption refrigerant inlet 9a and the thermal absorption refrigerant outlet 9b are arranged at an upper portion and at a lower portion in the thermal storage tank 10, respectively, so that reverse flows are formed between the thermal storage material 11 and the refrigerant in terms of temperature, aiming at obtaining a high level of thermal absorption effect during defrosting or at the start of heating.

Since the conventional air conditioning system is constructed as stated above, when it is impossible to obtain height required for the thermal storage tank 10 due to a limited installation space, not only how to flow the refrigerant at the thermal absorption heat exchanger 9 is limited, but also an installation area has to be widened to ensure a requisite capacity of the thermal storage material 11, which means that the thermal storage heat exchanger 8 at the lowest level has to be prepared in a large size. Making the thermal storage heat exchanger great creates a problem in that the balance between thermal storage and thermal absorption is upset to lower the efficiency of heat exchange.

Japanese Unexamined Patent Publication No. 163741/1988 discloses a solution to solve the problem. By this solution, the flow direction of the refrigerant in the thermal storage heat exchanger is reverse to the flow direction of the refrigerant in the thermal absorption heat exchanger, and a temperature distribution in the thermal storage material as a thermal medium forms a reverse flow to the flow direction of the refrigerant in terms of temperature in both thermal storage and thermal absorption, thereby allowing the thermal storage operation and the thermal absorption operation to be carried out effectively.

However, when thermal storage is made again e.g. immediately after completion of defrosting wherein the thermal storage material has been solidified, heat exchange is abruptly carried out in the vicinity of the thermal storage refrigerant inlet because a temperature difference between the refrigerant gas discharged from the compressor, and the thermal storage material is large. As a result, the temperature of the refrigerant in the vicinity of the thermal storage refrigerant outlet lowers, which brings such state that a raise in temperature of the thermal storage material in the vicinity of the thermal storage refrigerant outlet is later than a raise in temperature of the thermal storage material in the vicinity of the thermal storage refrigerant inlet, causing a non-uniform temperature distribution to be likely to appear in the thermal storage material. Such circumstances prevent the thermal storage material in the vicinity of and above the thermal storage refrigerant outlet from being fully melted in such operation that thermal storage and thermal absorption are repeated with a relatively shorter cycle like the heating operation accompanied by the defrosting operation. This creates a problem in that some portion of the thermal storage material can not be utilized in an effective manner, heating capability lowers during defrosting, the time required for defrosting lengthens, and the heating kick off capability lowers.

SUMMARY OF THE INVENTION

It is an object of the present invention to provide an air conditioning system which is provided with a thermal storage unit, and which is capable of melting a thermal storage material equally even when thermal storage and thermal absorption are repeated with a relatively short cycle, thereby realizing thermal storage and thermal absorption in effective manners to carry out a defrosting operation and a heating kick off operation effectively.

The foregoing and other objects of the present invention have been attained by providing an air conditioning system comprising a refrigeration cycle including a compressor, a reversing valve, a condenser, a pressure reducing device and an evaporator; a thermal storage heat exchanger which is arranged at a lower portion in a thermal storage tank with a thermal storage material filled therein, and whose refrigerant inlet side is smaller than its refrigerant outlet side in terms of heat exchange capability; and a thermal absorption heat exchanger which is arranged at an upper portion in the thermal storage tank in a way to be reverse to the flow direction of a refrigerant in the thermal storage heat exchanger.

In accordance with the present invention, the arrangement wherein the thermal storage refrigerant inlet side of the thermal storage heat exchanger arranged at the lower portion in the thermal storage tank is smaller than the thermal storage refrigerant outlet side in terms of heat exchange capability can prevent a high temperature and high pressure gaseous refrigerant discharged from the compressor from abruptly heating the thermal storage material at the refrigerant inlet side, and can heat the thermal storage material even at the thermal storage refrigerant outlet side in a sufficient manner. As a result, the thermal storage material can be equally melted in the vicinity of the thermal storage refrigerant inlet and in the vicinity of the thermal storage refrigerant outlet. The thermal storage material can be melted in its entirety without involving a useless portion in the thermal storage material. Defrosting capability, heating capability during defrosting, and heating kick off capability can be improved.

BRIEF DESCRIPTION OF THE DRAWINGS

In drawings.

DESCRIPTION OF THE PREFERRED EMBODIMENTS

Figure 1:
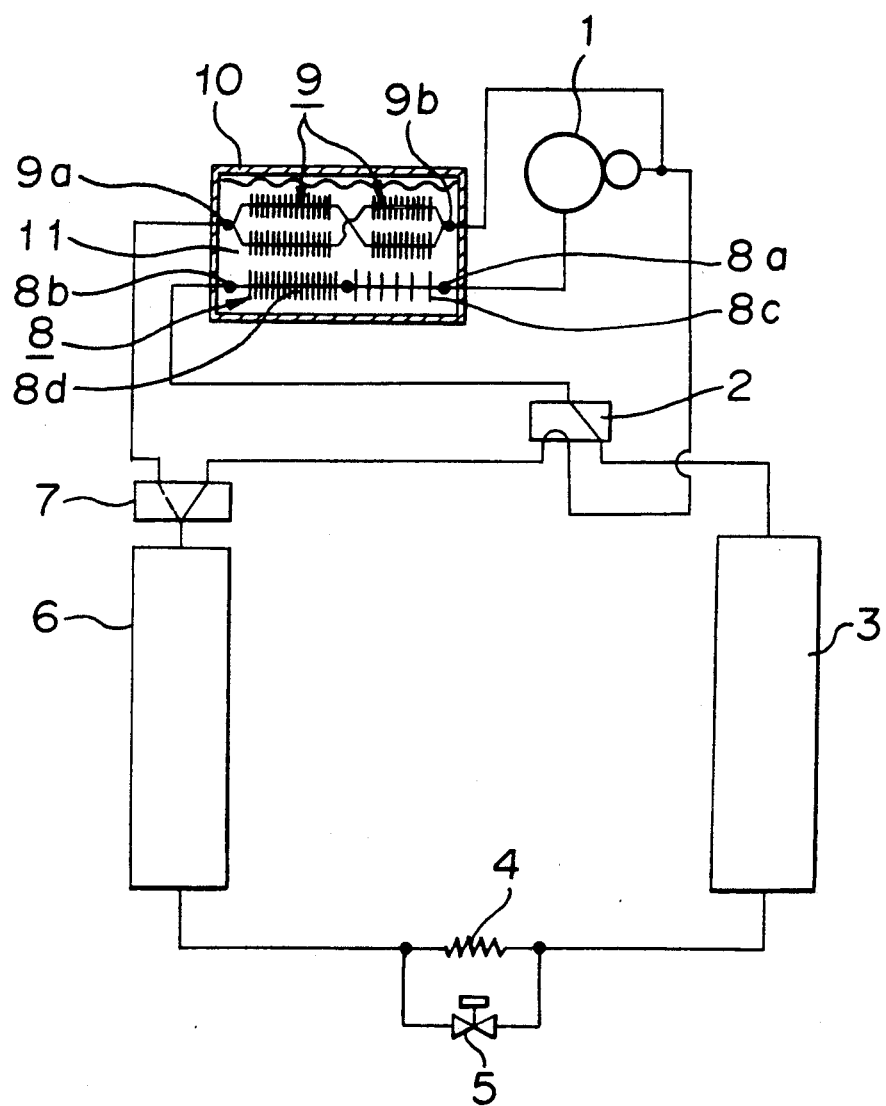
FIG. 1 is a diagram showing the refrigeration cycle of an air conditioning system with the thermal storage unit according to a first embodiment of the present invention.

Preferred embodiments of the present invention will be described with reference to the drawings wherein like reference numerals designate like or corresponding parts throughout the several views.

Firstly, a first embodiment of the present invention will be explained referring to FIG. 1.

Figure 4:
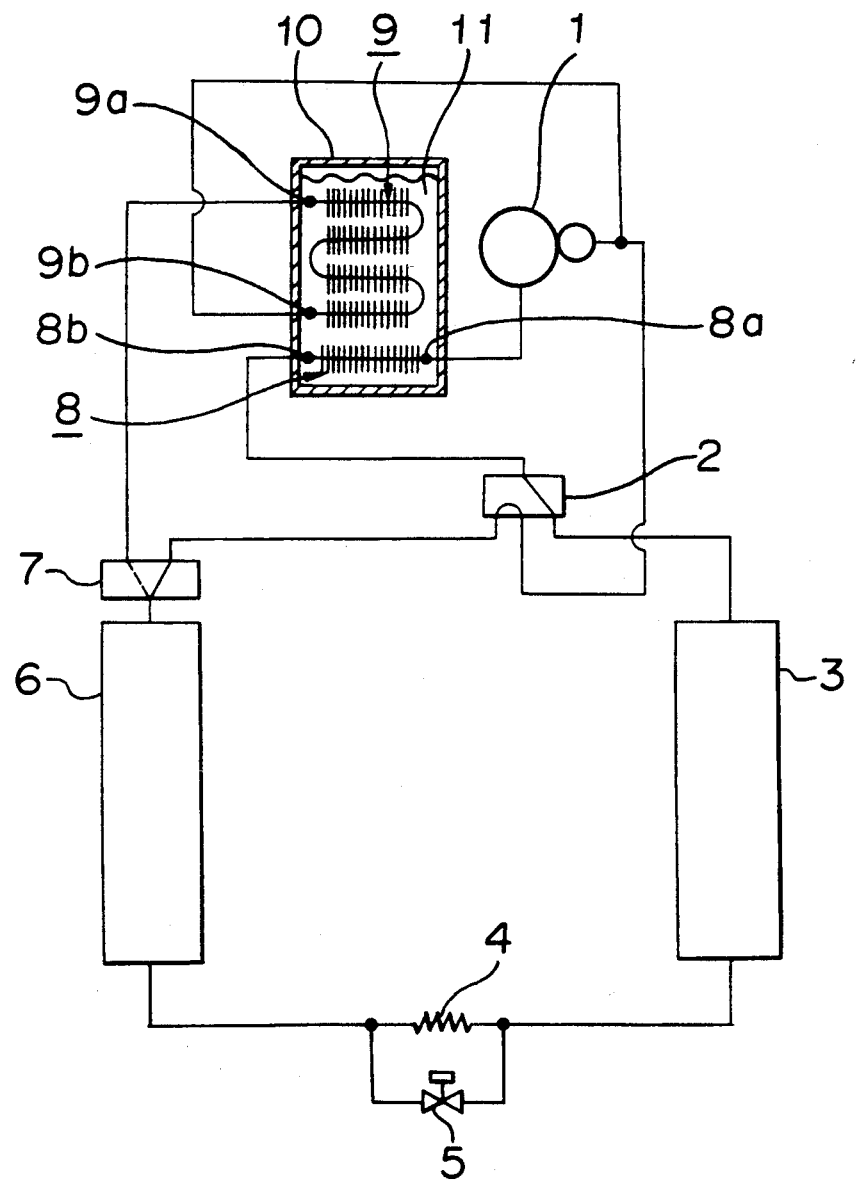
FIG. 4 is a diagram showing the refrigeration cycle of an air conditioning system which is provided with a conventional thermal storage unit.

In FIG. 1, there is shown a diagram of the refrigeration cycle in an air conditioning system which is provided with the thermal storage unit according to the first embodiment of the present invention. In FIG. 1, parts which are identical with or corresponding to the conventional parts of FIG. 4 are indicated by the same reference numerals as FIG. 4, and explanation on those parts will be omitted for the sake of simplicity.

In FIG. 1, reference numeral 8c designates a first thermal storage heat exchanger which is arranged at the side of a thermal storage refrigerant inlet 8a at a lower portion in a thermal storage tank 10, and which has a small number of fins to lessen a heat exchange area to a thermal storage material 11. Reference numeral 8d designates a second thermal storage heat exchanger which is arranged at the side of a thermal storage refrigerant outlet 8b at a lower portion in the thermal storage tank 10 to be connected in series with the first thermal storage heat exchanger 8c, and which has a high number of fins to extend a heat exchanger area to the thermal storage material 11. This means that the heat exchange capability of the first thermal storage heat exchanger 8c to the thermal storage material 11 is smaller than that of the second thermal storage heat exchanger 8d. Reference numeral 9 designates two thermal absorption heat exchangers which are arranged above the first thermal storage heat exchanger 8c and the second thermal storage heat exchanger 8d, and which diverge from each other upward and downward at a thermal absorption refrigerant inlet and a thermal absorption refrigerant outlet, and cross each other at a central portion.

An operation of the air conditioning system which is constructed in accordance with the first embodiment will be explained.

In the case of a heating and thermal storage operation, a two port bypass valve 5 is closed, and a three port valve 7 is switched to communicate with a four port reversing valve 2. A high temperature and high pressure gaseous refrigerant which has been discharged from a compressor 1 heats the thermal storage material 11 at the side of the thermal absorption refrigerant outlet 9b at the first thermal storage heat exchanger 8c, and then heats the thermal storage material at the side of the thermal absorption refrigerant inlet 9a at the second thermal storage heat exchanger 8d. After that, the refrigerant passes through the four port reversing valve 2, an indoor heat exchanger 3, a pressure reducing device 4, an outdoor heat exchanger 6, the three port valve 7 and the four port reversing valve 2 in that order, and returns to the compressor 1 like the conventional air conditioning system. In this cycle, indoor air is heated due to heat exchange with the indoor heat exchanger 3, and the thermal storage material is heated by the refrigerant having a high temperature to be melted.

The first thermal storage heat exchanger 8c wherein a temperature difference between the refrigerant and the thermal storage material 11 is large because the temperature of the refrigerant is quite high has the heat exchange area lessened, and the second thermal storage heat exchanger 8d wherein a temperature difference between the refrigerant and the thermal storage material 11 is small because the refrigerant temperature has lowered has the heat exchange area extended. Such an arrangement allows the thermal storage material 11 even at the side of the thermal storage refrigerant outlet 8b to be melted in a sufficient manner. As viewed from the thermal absorption side, the thermal storage material 11 has such a temperature distribution that the temperature at the thermal absorption refrigerant outlet 9b is slightly higher than that at the thermal absorption refrigerant inlet 9a.

On the other hand, in the case of a defrosting operation, the two port bypass valve 5 is opened, and the three port valve 7 is switched to communicate with the thermal absorption heat exchangers 9. The refrigerant which has been discharged from the compressor 1 heats the thermal storage material 11 at the first thermal storage heat exchanger 8c and the second thermal storage heat exchanger 8d, and then passes through the four port reversing valve 2, the indoor heat exchanger 3, the two port bypass valve 5, the outdoor heat exchanger 6, the three port valve 7 and the thermal absorption heat exchangers 9 in that order before returning to the compressor 1. In that manner, heating can be carried out during defrosting. In this cycle, the thermal storage material 11 is robbed of heat to be solidified. In addition, because the temperature of the thermal storage material 11 at the side of the thermal absorption refrigerant outlet 9b is slightly higher than that at the side of the thermal absorption refrigerant inlet 9a, a reverse flow is formed to the flow of the refrigerant.

In the case of a heating kick off operation, the two port bypass valve 5 is opened, and the three port valve 7 is switched to communicate with the thermal absorption heat exchangers 9 like the defrosting operation. The refrigerant which has been discharged from the compressor 1 heats the thermal storage material 11 at the first thermal storage heat exchanger 8c and the second thermal storage heat exchanger 8d, and then passes through the four port reversing valve 2, the indoor heat exchanger 3, the two port bypass valve 5, the outdoor heat exchanger 6, the three port valve 7 and the thermal absorption heat exchangers 9 before returning to the compressor 1. Since the refrigerant having a high temperature is inspired into the compressor 1 even if outdoor temperature is low, the efficiency of the compressor is good, and heating kick off capability can be obtained at a high level. In this cycle, the thermal storage material 11 is robbed of heat to be solidified. In addition, because the temperature of the thermal storage material 11 at the side of the thermal absorption refrigerant outlet 9b is slightly higher than that at the side of the thermal absorption refrigerant inlet 9a, a reverse flow is formed to the flow of the refrigerant.

As explained, the air conditioning system of the first embodiment has such an arrangement that the compressor 1, the four port reversing valve 2, the indoor heat exchanger 3 working as a condenser during heating, the pressure reducing device 4, and the outdoor heat exchanger 6 working as an evaporator during heating constitute a refrigerant cycle, that the thermal storage heat exchanger 8 which comprises the first thermal storage heat exchanger 8c and the second thermal storage heat exchanger 8d and wherein the heat exchange capability at the side of the thermal storage refrigerant inlet 8a is smaller than that at the side of the thermal storage refrigerant outlet 8b is arranged at the lower portion in the thermal storage tank 10 with the thermal storage material filled therein, and that the thermal absorption heat exchangers 9 are arranged at the upper portion in the thermal storage tank 10 to be reversed to the flow direction of the refrigerant in the thermal storage heat exchanger 8.

The arrangement of the first embodiment wherein the first thermal heat exchanger 8c and the second thermal storage heat exchanger 8d which are arranged at the lower portion in the thermal storage tank 10 are formed so that the first thermal storage heat exchanger 8c is smaller than the second thermal storage heat exchanger 8d in terms of heat exchange capability can avoid such a state that the high temperature and high pressure gaseous refrigerant abruptly heats the thermal storage material 11 at the side of the thermal storage refrigerant inlet 8a of the thermal storage heat exchanger 8. This arrangement enables the thermal storage material at the side of the thermal storage refrigerant outlet 8b to be also heated in a sufficient manner. As a result, the thermal storage material 11 in the vicinity of the thermal storage refrigerant inlet 8a and the thermal storage material 11 in the vicinity of the thermal storage refrigerant outlet 8b can be equally melted. The thermal storage material 11 can be melted in its entirety without loss, thereby improving defrosting capability, heating capability during defrosting, and heating kick off capability.

Next, a second embodiment of the present invention will be explained, referring to FIGS. 2 and 3.

Figure 2:
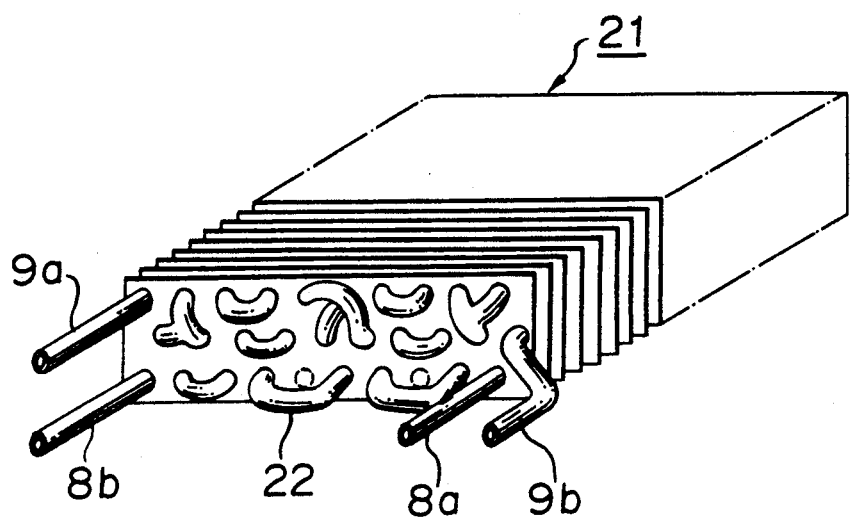
FIG. 2 is a perspective view of the appearance of the thermal storage and thermal absorption heat exchanger according to a second embodiment.

In FIG. 2, there is shown a perspective view of the appearance of the thermal storage and thermal absorption heat exchanger in the air conditioning system according to the second embodiment. In FIG. 3, there is shown a diagram showing the flow of the refrigerant in the thermal storage and thermal absorption heat exchanger of FIG. 2.

Figure 3:
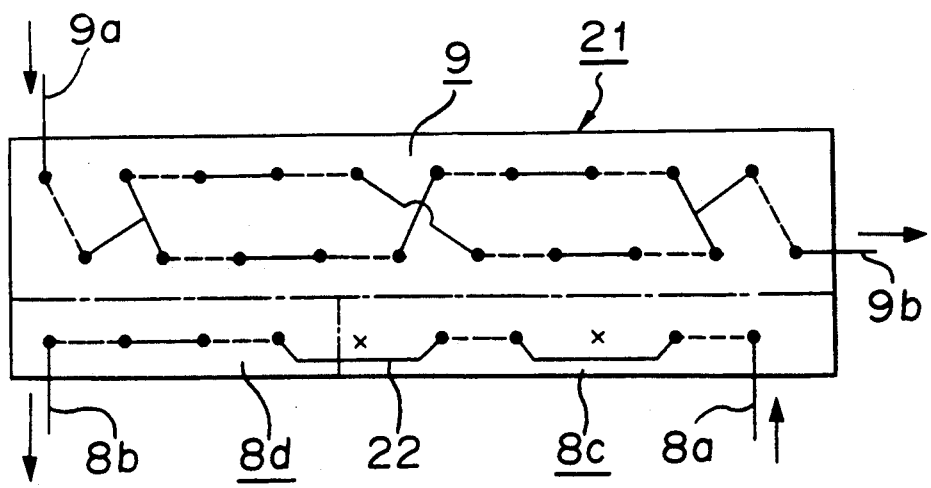
FIG. 3 is a schematic diagram showing the flow of a refrigerant in the thermal storage and thermal absorption heat exchanger of FIG. 2.

In FIGS. 2 and 3, reference numeral 21 designates the thermal storage and thermal absorption heat exchanger which is of a plate fin type, and which is constituted by a first thermal storage heat exchanger 8c, a second thermal storage heat exchanger 8d and a thermal absorption heat exchanger 9 as one unit. The first thermal storage heat exchanger 8c and the second thermal storage heat exchanger 8d are arranged at a lower stage in the thermal storage and thermal absorption heat exchanger 21 to be connected in series to each other so that the first thermal storage heat exchanger 8c is located at the side of a thermal storage refrigerant inlet 8a and the second thermal storage heat exchanger 8d is located at the side of a thermal storage refrigerant outlet 8b. In the thermal storage thermal absorption heat exchanger 21, there is a reverse flow relationship between the refrigerant flow from the first thermal storage heat exchanger 8c to the second thermal storage heat exchanger 8d, and that in the thermal absorption heat exchanger 9. The first thermal storage heat exchanger 8c is formed to have smaller heat exchange capability than the second thermal storage heat exchanger 8d by drawing an appropriate number of pipes 22 from it (as indicated by X in FIG. 3).

The air conditioning system of the second embodiment can offer advantages similar to the first embodiment because the first thermal storage heat exchanger 8c which constitutes the thermal storage and thermal absorption heat exchanger 21 together with the second thermal storage heat exchanger 8d is smaller than the second thermal storage heat exchanger 8d in terms of heat exchange capability. In particular, the second embodiment has such a arrangement that the thermal storage heat exchanger 8 and the thermal absorption heat exchanger 9 form the plate fin type of heat exchanger as one unit, and that the first thermal storage heat exchanger 8c is formed to have smaller heat exchange capability than the second thermal storage heat exchanger 8d by adjusting the number of the pipes 22. By this arrangement, equalizing in the melting of the thermal storage material 11 in the vicinity of the thermal storage refrigerant inlet 8a and in the vicinity of the thermal storage refrigerant outlet 8b, and balancing between thermal storage and thermal absorption can be realized with a simple structure and at an economical cost.

Although the first thermal storage heat exchanger 8c and the second thermal storage heat exchanger 8d are made to have different heat exchange capability by giving different numbers of the fins or the pipes in the thermal storage heat exchanger 8 of the first and second embodiments, the practice of the present invention is not limited to such a case. Other manners such as the use of fins or pipes 22 having different materials, the use of fins having different sizes, the use of pipes having different diameters or the like can be utilized.

Although the thermal storage heat exchanger 8 of the first and second embodiment is constituted by two kinds of heat exchangers, i.e. the first thermal storage heat exchanger 8c and the second thermal storage heat exchanger 8d, the thermal storage heat exchanger 8 can be divided into three kinds or more of heat exchangers. The thermal storage heat exchanger 8 may have such a structure that the number of the fins is successively modified to successively change heat exchange capability. In short, it is sufficient that the heat exchange capability grows larger from the thermal storage refrigerant inlet 8a to the thermal storage refrigerant outlet 8b, and the thermal storage material 11 in the vicinity of the thermal storage refrigerant outlet 8b can be also equally melted.

Although two upper and lower diverged tubes cross each other at the central portion in the thermal storage heat exchanger 9 of the first and second embodiments, the practice of the present invention is not limited to such a case. The thermal storage heat exchanger 9 can be constituted by using a single tube. The tubes may not cross. It is preferable that the tubes are crossed to equalize a temperature distribution in the thermal storage material 11 in the upper and lower directions because there are variations in the temperature distribution due to convection.

What is claimed is:

1. An air conditioning system comprising:
   a refrigeration cycle including a compressor, a reversing valve, a condenser, a pressure reducing device and an evaporator;
   a thermal storage heat exchanger arranged in a lower portion of a thermal storage tank, the thermal storage tank having a thermal storage material filled therein, said thermal storage heat exchanger having a refrigerant inlet side with a first thermal storage heat exchanger having a first heat exchange capability and a refrigerant outlet side with a second thermal storage heat exchanger connected in series and longitudinally aligned with the first thermal storage heat exchanger, said second thermal storage heat exchanger having a second heat exchange capability, wherein the first heat exchange capability of the first thermal storage heat exchanger is smaller than the second heat exchange capability of the second thermal storage heat exchanger; and
   at least two longitudinally aligned thermal absorption heat exchangers positioned parallel to and above the thermal storage heat exchanger and arranged in an upper portion of the thermal storage tank so as to provide a reverse flow with respect to a flow direction of a refrigerant in the thermal storage heat exchanger, one of said at least two thermal absorption heat exchangers being positioned above and adjacent to said first thermal storage heat exchanger and the other of said at least two thermal absorption heat exchangers being positioned above and adjacent to said second thermal storage heat exchanger;

wherein:

said thermal storage heat exchanger substantially equally melts said thermal storage material in a vicinity of the refrigerant inlet side of said thermal storage heat exchanger and a vicinity of the refrigerant outlet side of said thermal storage heat exchanger; and a temperature of the thermal storage material at an outlet of said thermal absorption heat exchanger is slightly higher than a temperature of the thermal storage material at an inlet of said thermal absorption heat exchanger.

2. An air conditioning system according to claim 1, wherein the first thermal storage heat exchanger has a smaller number of fins than the second thermal storage heat exchanger.

3. An air conditioning system according to claim 1, wherein the at least two thermal absorption heat exchanger comprises at least two thermal absorption heat exchangers which diverge from each other upward and downward at a thermal absorption refrigerant inlet and a thermal absorption refrigerant outlet, and cross each other at a central portion.

4. An air conditioning system according to claim 1, wherein the thermal storage heat exchangers and the thermal absorption heat exchangers are combined as one unit.

5. An air conditioning system according to claim 1, wherein the first thermal storage heat exchanger is formed to have the small heat exchanger capability by drawing a desired number of pipes.

* * * * *